Oct. 2, 1956

H. REIFENHÄUSER 2,764,780

MULTIPLE SCREW EXTRUDING PRESS

Filed Feb. 24, 1953

INVENTOR
Hans Reifenhäuser

United States Patent Office 2,764,780
Patented Oct. 2, 1956

2,764,780

MULTIPLE SCREW EXTRUDING PRESS

Hans Reifenhäuser, Troisdorf, Rhineland, Germany, assignor to Hugo Stinnes Verwaltung G. m. b. H., Mulheim an der Ruhr, Germany Application February 24, 1953, Serial No. 338,477

Claims priority, application Germany February 23, 1952

6 Claims. (Cl. 18—12)

The present invention relates to extruding presses.

More particularly, the present invention relates to extruding presses having coaxially arranged multiple screws for simultaneously forcing different quantities of material through the press to the outlet thereof.

With multiple screw extruding presses of this type, there is a certain disadvantage which arises due to the fact that the material of the innermost worm screw and casing tends to back up along the space between the outermost screw thread and this inner casing. Many attempts have been made to overcome this defect, as by providing sealing rings and the like, but these attempts are quite complicated and are not always successful.

One of the objects of the present invention is to overcome the above disadvantages by providing a multiple screw extruding press which will absolutely prevent any material from backing up in the press.

A further object of the present invention is to provide an extrusion press of this type which requires no sealing means or similar devices to prevent the material from backing up.

An additional object of the present invention is to provide an extruding press which will very efficiently move a great quantity of the material through the press without any of this material backing up.

With the above objects in view, the present invention mainly consists of an extrusion press which includes an outer elongated tubular casing in which an elongated hollow worm screw is mounted for turning movement, this worm screw having an outer screw thread located next to the inner surface of the casing and an inner screw thread located at the inner surface of the worm screw. An elongated guide is located within the worm screw next to the inner thread thereof for guiding the worm screw, so that any material located between the guide and worm screw will be moved along by the inner screw thread thereof.

Figure 1:
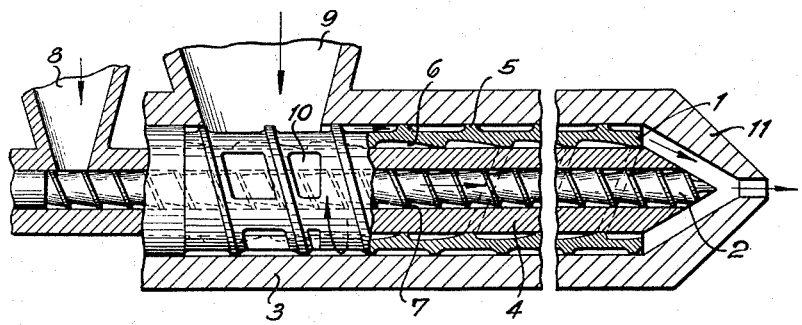
Figure 2:
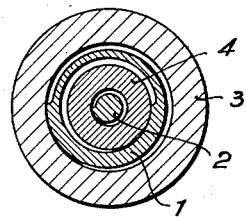

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a longitudinal, sectional, elevational, fragmentary view of an extruding press constructed in accordance with the present invention; and Fig. 2 is a transverse sectional view taken along a central part of the structure of Fig. 1.

Referring now to the drawings, it will be seen that the apparatus of the invention includes an elongated hollow worm screw 1 having an outer screw thread 5 and an inner screw thread 6. This hollow worm screw 1 is located within an outer elongated hollow casing 3 having an outlet 11, the worm screw 1 having its outer thread 5 located next to the inner surface of the casing 3, and the worm screw 1 being turnably mounted in the casing 3 and being adapted to be turned by any suitable drive means, such as a motor or the like (not shown). A hopper means 9 communicates with the interior of the casing 3 to provide material to the interior of the latter and to the screw thread 5.

An elongated guide member 4 is located within the worm screw 1 next to the inner screw thread 6 thereof to guide the worm screw 1. Thus, any material having the tendency to back up along the space between the worm screw 1 and guide 4 will be positively moved by the thread 6 toward the outlet 11 so that in this way the necessity for any sealing rings or the like to prevent backing up of material between the guide 4 and worm screw 1 is completely avoided.

This guide 4 is hollow and forms a second casing in which a worm screw 2 is located for turning movement therein, and the thread 7 of worm screw 2 is located next to the inner surface of the casing 4. A second hopper means 8 communicates with the interior of the casing 4 to supply material to the latter for movement toward the outlet 11 together with material acted on by the worm screw 1.

The present invention takes positive advantage of the screw thread 6 by providing the worm screw 1 with a plurality of openings 10 in the region of the hopper means 9. Thus, material supplied to the hopper means 9, in addition to moving along the outer casing 3 and cooperating with the thread 5, will also move through the openings 10 to the inner thread 6 of worm screw 1 to be moved along the outer wall of casing 4 by these inner threads 6, so that in this way a considerable amount of material is moved through the extruding press of the invention, while at the same time any backing up of material along the space between casing 4 and worm screw 1 is positively prevented.

It will be understood that each of the elements described above, or two or more together, may also find a useful application in other types of extruding presses differing from the types described above.

While the invention has been illustrated and described as embodied in multiple screw extruding presses, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. An extrusion press comprising, in combination, an outer elongated tubular casing; an elongated hollow worm screw mounted in said tubular casing for turning movement therein, said worm screw having an outer screw thread located next to the inner surface of said casing and an inner screw thread located at the inner surface of said worm screw; an elongated stationary guide located within said worm screw next to said inner thread thereof for guiding said worm screw, whereby any material located between said guide and worm screw will be moved along by said inner screw thread, said elongated guide being hollow and forming a second casing; and a second worm screw located in said second casing for turning movement therein.

2. An extrusion press comprising, in combination, an outer elongated tubular casing; an elongated hollow worm screw mounted in said tubular casing for turning movement therein, said worm screw having an outer screw thread located next to the inner surface of said casing and an inner screw thread located at the inner surface of said worm screw; an elongated stationary guide located within said worm screw next to said inner thread thereof for guiding said worm, whereby any material located between said guide and worm screw will be moved along by said inner screw thread, said elongated guide being hollow and forming a second casing; a second worm screw located in said second casing for turning movement therein; and hopper means connected to and communicating with the interior of said outer casing for supplying material to the latter.

3. An extrusion press comprising, in combination, an outer elongated tubular casing; an elongated hollow worm screw mounted in said tubular casing for turning movement therein, said worm screw having an outer screw thread located next to the inner surface of said casing and an inner screw thread located at the inner surface of said worm screw, the latter being formed at a portion thereof located forwardly of the rearmost end of said inner screw thread with a plurality of openings passing therethrough; an elongated stationary guide located within said worm screw next to said inner thread thereof for guiding said worm screw, whereby any material located between said guide and worm screw will be moved along by said inner screw thread, said elongated guide being hollow and forming a second casing; a second worm screw located in said second casing for turning movement therein; and hopper means connected to and communicating with the interior of said outer casing for supplying material to the latter, said hopper means being located opposite said openings of said worm screw to supply material through said openings to the space between said guide and inner screw thread of said worm screw.

4. An extrusion press comprising, in combination, an outer elongated tubular casing; an elongated hollow worm screw mounted in said tubular casing for turning movement therein, said worm screw having an outer screw thread located next to the inner surface of said casing and an inner screw thread located at the inner surface of said worm screw; means located forwardly of the rearmost end of said inner screw thread for providing communication between said inner and outer screw threads; an elongated stationary guide located within said worm screw next to said inner thread thereof for guiding said worm screw, whereby any material located between said guide and worm screw will be moved along by said inner screw thread, said elongated guide being hollow and forming a second casing; a second worm screw located in said second casing for turning movement therein; first hopper means connected to and communicating with the interior of said outer casing for supplying material to the latter; and a second hopper means connected to and communicating with the interior of said second casing for supplying material to the interior of said second casing and said second worm screw.

5. An extrusion press comprising, in combination, an outer elongated tubular casing having a free end formed with a nozzle chamber; an elongated hollow worm screw mounted in said tubular casing for turning movement therein, said worm screw having an outer screw thread located next to the inner surface of said casing and an inner screw thread located at the inner surface of said worm screw, said outer and said inner screw threads of said hollow worm screw being adapted to feed a plastic material into said nozzle chamber; an elongated stationary guide located within said worm screw next to said inner thread thereof for guiding said worm screw, whereby any material located between said guide and worm screw will be moved along by said inner screw thread, said elongated guide being hollow and forming a second casing and having an annular end face in said nozzle chamber; a second worm screw located in said second casing for turning movement therein being adapted to feed another material into said nozzle chamber and being separated in said nozzle chamber by said annular end face; hopper means connected to and communicating with the interior of said outer casing for supplying material to the latter; and a second hopper means connected to and communicating with the interior of said second casing for supplying material to the interior of said second casing and said second worm screw.

6. An extrusion press comprising, in combination, an outer elongated tubular casing having a free end formed with a nozzle chamber; an elongated hollow worm screw mounted in said tubular casing for turning movement therein, said worm screw having an outer screw thread located next to the inner surface of said casing and an inner screw thread located at the inner surface of said worm screw, the latter being formed at a portion thereof located forwardly of the rearmost end of said inner screw thread with a plurality of openings passing therethrough, said outer and said inner screw threads of said hollow worm screw being adapted to feed a plastic material into said nozzle chamber; an elongated stationary guide located within said worm screw next to said inner thread thereof for guiding said worm screw, whereby any material located between said guide and worm screw will be moved along by said inner screw thread, said elongated guide being hollow and forming a second casing and having an annular end face in said nozzle chamber; a second worm screw located in said second casing for turning movement therein being adapted to feed another material into said nozzle chamber and being separated in said nozzle chamber by said annular end face; hopper means connected to and communicating with the interior of said outer casing for supplying material to the latter, said hopper means being located opposite said openings of said worm screw to supply material through said openings to the space between said guide and inner screw thread of said worm screw; and a second hopper means connected to and communicacting with the interior of said second casing for supplying material to the interior of said second casing and said second worm screw.

References Cited in the file of this patent

UNITED STATES PATENTS

| 1,516,841 | Buttfield | Nov. 25, 1924 |

FOREIGN PATENTS

| 372,214 | Germany | Mar. 23, 1923 |
| 902,287 | France | Nov. 27, 1944 |